(12) United States Patent
Zimmer et al.

(10) Patent No.: US 7,897,664 B2
(45) Date of Patent: Mar. 1, 2011

(54) PNEUMATIC TIRE

(75) Inventors: Rene Jean Zimmer, Howald (LU);
Hans-Bernd Fuchs, Konz (DE);
Georges Koster, Steinfort (LU); Claude Ernest Felix Boes, Erpeldange (LU);
Wolfgang Albert Lauer, Mersch (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/628,340

(22) Filed: Dec. 1, 2009

(65) Prior Publication Data
US 2010/0076126 A1 Mar. 25, 2010

Related U.S. Application Data

(63) Continuation of application No. 11/858,410, filed on Sep. 20, 2007.

(51) Int. Cl.
*C08K 5/15* (2006.01)
*C08K 5/1515* (2006.01)
*B60C 5/00* (2006.01)

(52) U.S. Cl. .................. 524/109; 152/450

(58) Field of Classification Search .......... 524/109; 152/450
See application file for complete search history.

(56) References Cited

U.S. PATENT DOCUMENTS

| | | | | |
|---|---|---|---|---|
| 6,093,271 A | * | 7/2000 | Majumdar | 156/116 |
| 6,298,889 B1 | * | 10/2001 | Smith | 152/151 |
| 6,951,952 B2 | * | 10/2005 | Cheon et al. | 549/265 |
| 7,008,759 B2 | * | 3/2006 | Cheon et al. | 430/332 |
| 2004/0204317 A1 | * | 10/2004 | Cheon et al. | 503/218 |
| 2005/0217782 A1 | * | 10/2005 | Agostini | 152/525 |

* cited by examiner

*Primary Examiner* — Mark Eashoo
*Assistant Examiner* — Angela C Scott
(74) *Attorney, Agent, or Firm* — John D. DeLong

(57) ABSTRACT

The present invention relates to a pneumatic tire having a component comprising at least one elastomer containing olefinic unsaturation; and compound of formula I

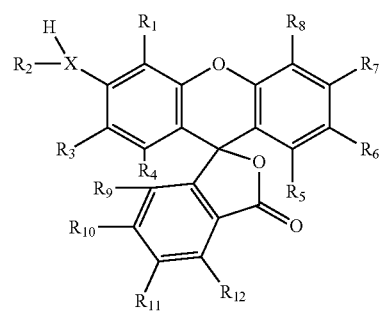

wherein:
$R_1$, $R_3$, $R_4$, $R_5$, $R_6$, and $R_8$ are each independently hydrogen, alkyl, aryl, halogen, or substituted or unsubstituted oxygen, nitrogen or sulfur atoms;
$R_2$ is hydrogen, alkyl, aryl, or is absent;
$R_7$ is substituted or unsubstituted oxygen, nitrogen, sulfur, or halogen;
$R_9$, $R_{10}$, $R_{11}$ and $R_{12}$ are each independently hydrogen, alkyl, aryl, halogen, nitro or substituted or unsubstituted oxygen, nitrogen or sulfur atoms;
and X is oxygen, sulfur, or nitrogen.

8 Claims, No Drawings

PNEUMATIC TIRE

This is a Continuation of Application Ser. No. 11/858,410, filed on Sep. 20, 2007, currently pending.

BACKGROUND OF THE INVENTION

Pneumatic tires often desirably have indicial markings, such as trademarks or other markings. These indicia typically are formed directly into the rubber sidewall during the tire molding process. Thus, the indicia may be raised lettering or other shapes, and may be colored with white pigments or other colorants in the rubber compound.

It is sometimes desired to apply indicia directly to an already molded and cured tire, typically on the sidewall area. To do this, various coatings, inks and paints have been used to form indicia. However, poor adhesion or durability of the coatings usually leads to unacceptable performance of this type of indicia.

It would, therefore, be desirable to have a tire with indicia on a tire sidewall surface, wherein the indicia offers good durability.

SUMMARY OF THE INVENTION

The present invention relates to a pneumatic tire having a component comprising at least one elastomer containing olefinic unsaturation; and compound of formula I

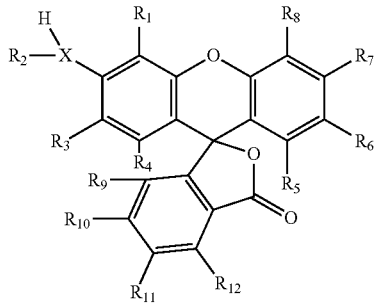

wherein:
$R_1$, $R_3$, $R_4$, $R_5$, $R_6$, and $R_8$ are each independently hydrogen, alkyl, aryl, halogen, or substituted or unsubstituted oxygen, nitrogen or sulfur atoms;
$R_2$ is hydrogen, alkyl, aryl, or is absent;
$R_7$ is substituted or unsubstituted oxygen, nitrogen, sulfur, or halogen;
$R_9$, $R_{10}$, $R_{11}$ and $R_{12}$ are each independently hydrogen, alkyl, aryl, halogen, nitro or substituted or unsubstituted oxygen, nitrogen or sulfur atoms;
and X is oxygen, sulfur, or nitrogen.

DETAILED DESCRIPTION OF THE INVENTION

The present invention relates to a pneumatic tire having a component comprising at least one elastomer containing olefinic unsaturation; and compound of formula I

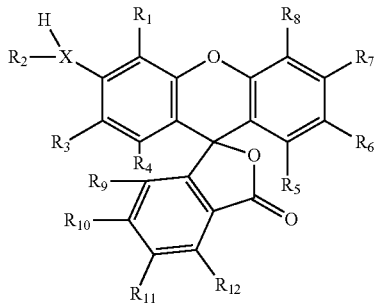

wherein:
$R_1$, $R_3$, $R_4$, $R_5$, $R_6$, and $R_8$ are each independently hydrogen, alkyl, aryl, halogen, or substituted or unsubstituted oxygen, nitrogen or sulfur atoms;
$R_2$ is hydrogen, alkyl, aryl, or is absent;
$R_7$ is substituted or unsubstituted oxygen, nitrogen, sulfur, or halogen;
$R_9$, $R_{10}$, $R_{11}$ and $R_{12}$ are each independently hydrogen, alkyl, aryl, halogen, nitro or substituted or unsubstituted oxygen, nitrogen or sulfur atoms;
and X is oxygen, sulfur, or nitrogen.

The component of the self-luminescent pneumatic tire includes vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, chlorobutyl rubber, bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. In various embodiments, the rubber or elastomers are selected from natural rubber (NR), epoxidized natural rubber (ENR), synthetic polyisoprene (IR), polychloroprene rubber (CR), polybutadiene (BR), styrene-butadiene rubber (SBR), isoprene-butadiene rubber (IBR), styrene-isoprene-butadiene rubber (SIBR), ethylene-propylene-diene rubber (EPDM), isobutylene-isoprene rubber (IIR, butyl rubber), isobutylene-isoprene rubber-chlorinated (CIIR, chlorobutyl rubber), isobutylene-isoprene rubber-brominated (BIIR, bromobutyl rubber), acrylonitrile-isoprene rubber (NIIR), acrylonitrile-butadiene rubber (NBR), urethane rubber (EU), and methysilicone rubbers (MQ, VMQ, PVMQ, FMQ).

In another embodiment, the rubber composition may include a rubber or elastomer containing olefinic unsaturation and an additional functional group reactive with the sulfur containing organosilicon compounds of Formula II described later. Representative functional groups include halogens, such as Cl and Br; alkoxy groups, such as methoxy groups; and pseudohalogens, such as —SCN.

In another embodiment, the elastomer containing olefinic unsaturation may be a siloxy-terminated polymer, such as siloxy-terminated styrene-butadiene copolymer, siloxy-terminated isoprene-butadiene copolymer and siloxy-terminated styrene-isoprene-butadiene terpolymer.

In one aspect the rubber may be of at least two of diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization-derived styrene/butadiene rubbers, cis 1,4-polybutadiene rubbers and emulsion polymerization prepared butadiene/acrylonitrile copolymers.

In one embodiment, an emulsion polymerization-derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of a tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene-based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "butyl-type" polymers or butyl rubber relates to isobutylene copolymers comprised of isobutylene and a minor amount of conjugated diene (e.g. from about 0.5 to about 3 weight percent conjugated diene such as for example isoprene), which are conventionally referred to as butyl rubbers, as well as halogenated (e.g., brominated or chlorinated) butyl rubber as well as copolymers, particularly brominated copolymers, of isobutylene and para methylstyrene.

The term "phr" as used herein, and according to conventional practice, refers to "parts by weight of a respective material per 100 parts by weight of rubber, or elastomer."

According to this invention, it is believed to be a very substantial departure from past practice, for tires, to utilize a compound wherein a color change ensues upon the change in the compound from one tautomeric state to another tautomeric state. For example, in one tautomeric form the compound may be in a colorless crystalline state, and upon change to another tautomeric form the compound may be in an amorphous state exhibiting a distinct color. Such change in tautomeric form may result for example by heating or otherwise electronically exciting the compound, as with a laser or other heat source.

The rubber composition thus includes a compound wherein a color change ensues upon the change in the compound from one tautomeric state to another tautomeric state. In one embodiment, the rubber composition comprises a compound of formula I and any of its tautomeric forms:

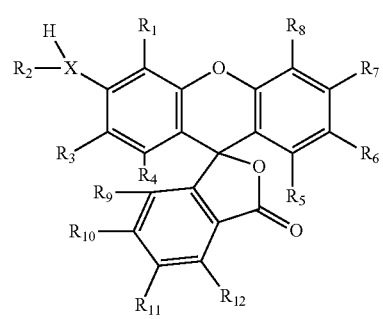

wherein:
$R_1$, $R_3$, $R_4$, $R_5$, $R_6$, and $R_8$ are each independently hydrogen, alkyl, aryl, halogen, or substituted or unsubstituted oxygen, nitrogen or sulfur atoms;
$R_2$ is hydrogen, alkyl, aryl, or is absent;
$R_7$ is substituted or unsubstituted oxygen, nitrogen, sulfur, or halogen;
$R_9$, $R_{10}$, $R_{11}$ and $R_{12}$ are each independently hydrogen, alkyl, aryl, halogen, nitro or substituted or unsubstituted oxygen, nitrogen or sulfur atoms;
and X is oxygen, sulfur, or nitrogen.

In one embodiment, the compound of formula I is one in which $R_2$ is absent, $R_4$, $R_5$, $R_9$, $R_{10}$, $R_{11}$ and $R_{12}$ are each hydrogen, X is oxygen, and the other substituents are selected from the group consisting of:

$R_1$ and $R_8$ are each hydrogen, $R_3$ and $R_6$ are each n-hexyl and $R_7$ is benzyloxy;
$R_1$ and $R_8$ are each hydrogen, $R_3$ and $R_6$ are each n-hexyl and $R_7$ is ethoxy;
$R_1$ and $R_8$ are each hydrogen, $R_3$ and $R_6$ are each ethyl and $R_7$ is benzyloxy;
$R_1$ and $R_8$ are each hydrogen, $R_3$ and $R_6$ are each n-hexyl and $R_7$ is ethoxy;
$R_1$ and $R_8$ are each methyl, $R_3$ and $R_6$ are each hydrogen and $R_7$ is benzyloxy;
$R_1$ and $R_8$ are each methyl, $R_3$ and $R_6$ are each hydrogen and $R_7$ is 2-methoxyethoxy;
$R_1$ and $R_8$ are each hydrogen, $R_3$ and $R_6$ are each ethyl and $R_7$ is 3-methylbut-1-oxy;
$R_1$ and $R_8$ are each hydrogen, $R_3$ and $R_6$ are each ethyl and $R_7$ is 2-methylbenzyloxy;
$R_1$ and $R_8$ are each hydrogen, $R_3$ and $R_6$ are each ethyl and $R_7$ is 3-methylbenzyloxy;
$R_1$ and $R_8$ are each hydrogen, $R_3$ and $R_6$ are each benzyl and $R_7$ is benzyloxy;
$R_1$ and $R_8$ are each hydrogen, $R_3$ and $R_6$ are each propyl, and $R_7$ is benzyloxy; and
$R_1$ and $R_8$ are each hydrogen, $R_3$ and $R_6$ are each benzyl and $R_7$ is 3-methylbut-1-oxy. Compounds according to this embodiment may be made following the methods of Ser. No. 10/789,566.

In one embodiment, the compound of formula I is one in which $R_2$ is absent; $R_4$, $R_5$, $R_6$, $R_8$, $R_9$, $R_{10}$, $R_{11}$ and $R_{12}$ are each hydrogen; X is oxygen; and the other substituents are selected from the group consisting of:

$R_1$ is hydrogen, $R_3$ is bromine and $R_7$ is phenylamino;
$R_1$ is hydrogen, $R_3$ is bromine and $R_7$ is N-ethyl-N-phenylamino;
$R_1$ is hydrogen, $R_3$ is bromine and $R_7$ is N-butyl-N-phenylamino;
$R_1$ is hydrogen, $R_3$ is bromine and $R_7$ is N-hexyl-N-phenylamino;
$R_1$ is hydrogen, $R_3$ is bromine and $R_7$ is N-benzyl-N-phenylamino;
$R_1$ is hydrogen, $R_3$ is bromine and $R_7$ is N,N-diphenylamino;
$R_1$ is methyl, $R_3$ is bromine and $R_7$ is N-hexyl-N-phenylamino;
$R_1$ is methyl, $R_3$ is bromine and $R_7$ is N-indolinyl; and
$R_1$ is methyl, $R_3$ is bromine and $R_7$ is N-hexadecyl-N-phenylamino. Compounds according to this embodiment may be made following the methods of Ser. No. 10/789,276.

In one embodiment, the compound of formula I is one in which $R_1$, $R_3$, $R_4$, $R_5$, $R_6$, and $R_8$ are each hydrogen; X is nitrogen; and the other substituents are selected from the group consisting of:

$R_2$ is phenyl, $R_7$ is phenylamino, and $R_9$, $R_{10}$, $R_{11}$ and $R_{12}$ are each hydrogen;
$R_2$ is 2-methylphenyl, $R_7$ is 2-methylphenylamino, and $R_9$, $R_{10}$, $R_{11}$ and $R_{12}$ are each hydrogen;
$R_2$ is 2-ethylphenyl, $R_7$ is 2-ethylphenylamino, and $R_9$, $R_{10}$, $R_{11}$ and $R_{12}$ are each hydrogen;
$R_2$ is 2,4,6-trimethylphenyl, $R_7$ is 2,4,6-trimethylphenylamino, and $R_9$, $R_{10}$, $R_{11}$ and $R_{12}$ are each hydrogen;
$R_2$ is 2-chlorophenyl, $R_7$ is 2-chlorophenylamino, and $R_9$, $R_{10}$, $R_{11}$ and $R_{12}$ are each hydrogen; and
$R_2$ is 2-methyl-4-octadecyloxyphenyl, $R_7$ is N-indolinyl, and $R_9$, $R_{10}$, $R_{11}$ and $R_{12}$ are each fluorine. Compounds according to this embodiment may be made following the methods of Ser. No. 10/788,963.

Compounds of formula I may exhibit an equilibrium with other tautomeric forms, i.e., the compounds exist as different interconverting isomers in equilibrium. For example, compounds of formula I may exhibit an equilibrium with compounds of formula II as shown. Other isomers of formula I may also exist as tautomers. Of interest to the present invention, certain tautomers of compound I may show distinct desirable colors. Thus, the equilibrium between particular tautomers may be influenced by the temperature or chemical environment to favor the presence of a particular, desirable tautomer. Thus while a compound of formula I may be in a crystalline form and show no color, a tautomer forming under certain conditions of temperature, electromagnetic excitation or the chemical surroundings of the compound may favor the formation of a color tautomer.

The amount of compound of formula I in the rubber composition may range from 1 to 100 phr. The amount of compound of formula I used in the rubber composition generally depends on the desired intensity of the resulting color.

The commonly-employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. In one embodiment, the silica is a synthetic amorphous precipitated silica having a BET surface area in a range of about 140 to about 180 m²/g. The BET method of measuring surface area is described in the *Journal of the American Chemical Society*, Volume 60, Page 304 (1930).

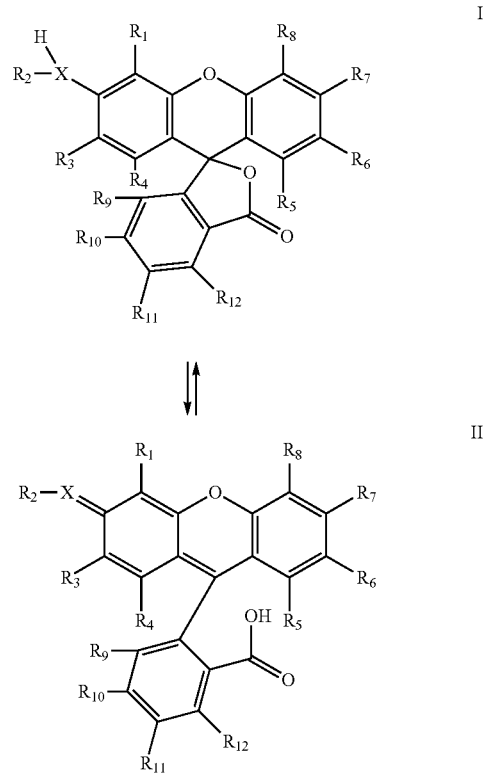

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size. In one embodiment, nanosized silica in a particle size range of 1 to 100 nanometers may be used.

Various commercially available silicas may be used such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

In addition to silica, the rubber composition may contain other fillers. Representative fillers include carbon black, aluminosilicates, clays, zeolites, modified starches, carbon black/silica composites, and the like. So-called nanofillers having particle sizes ranging from 1 to 100 nanometers, including nanosilicates, nanotitanates, and the like may be used. Such fillers may be present in an amount ranging from 10 to 150 phr. If carbon black is used, the amount of carbon black may vary. Generally speaking, the amount of carbon black will vary from 0 to 80 phr. Preferably, the amount of carbon black will range from 0 to 40 phr. It is to be appreciated that a silica coupler may be used (described later) in conjunction with a carbon black, namely pre-mixed with a carbon black prior to addition to the rubber composition, and such carbon black is to be included in the aforesaid amount of carbon black for the rubber composition formulation.

The rubber composition may be used with a silica-coupling agent. Example of suitable coupling agents includes sulfur containing organosilicon compounds. Examples of suitable sulfur containing organosilicon compounds are of the formula Z-Alk-S$_n$-Alk-Z     III in which Z is selected from the group consisting of

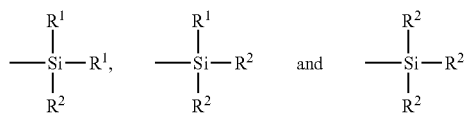

where R$^1$ is an alkyl group of 1 to 4 carbon atoms, cyclohexyl or phenyl; R$^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2''-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2''-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) tetrasulfide and 3,3'-bis(triethoxysilylpropyl) disulfide. Preferably Z is

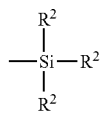

where R$^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 4.

The amount of the above sulfur containing organosilicon compound in a rubber composition will vary depending on the level of silica that is used. Generally speaking, the amount of the compound of Formula III will range from 0 to 1.0 parts by weight per part by weight of the silica. Preferably, the amount will range from 0 to 0.4 parts by weight per part by weight of the silica.

It is readily understood by those having skill in the art that the rubber composition may contain conventional additives generally known in the rubber compounding art such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344-346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

In some cases, the use of sulfur as a curative is not desired as the sulfur may interfere with the phosphorescent agent, as with alkaline earth metal aluminate phosphors. In one embodiment, a free radical crosslinking reaction may be used to cure the rubber composition. The reaction may be via UV cure system or peroxide cure system. Well-known classes of peroxides that may be used include diacyl peroxides, peroxyesters, dialkyl peroxides and peroxyketals. Specific examples include dicumyl peroxide, n-butyl-4,4-di(t-butylperoxy) valerate, 1,1-di(t-butylperoxy)-3,3,5-trimethylcyclohexane, 1,1-di(t-butylperoxy)cyclohexane, 1,1-di(t-amylperoxy)cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, .alpha., .alpha.'-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof. Typical amounts of peroxide ranges from 1 to 12 phr (based on active parts of peroxide). Preferably, the amount of peroxide ranges from 2 to 6 phr.

A co-agent may be present during the free radical crosslinking reaction. Co-agents are monofunctional and polyfunctional unsaturated organic compounds which are used in conjunction with the free radical initiators to achieve improved vulcanization properties. Representative examples include organic acrylates, organic methacrylates, divinyl esters, divinyl benzene, bis-maleimides, triallylcyanurates, polyalkyl ethers and esters, metal salts of an alpha-beta unsaturated organic acid and mixtures thereof.

The co-agent may be present in a range of levels. Generally speaking, the co-agent is present in an amount ranging from 0.1 to 40 phr. Preferably, the co-agent is present in an amount ranging from 2 to 15 phr.

The mixing of the rubber composition can be accomplished by methods known to those having skill in the rubber mixing art. For example, the ingredients are typically mixed in at least two stages, namely at least one non-productive stage followed by a productive mix stage. In accordance with a preferred embodiment, the high reinforcing grade silica is initially mixed with the rubber, for example, in a first non-productive followed by the addition of the low reinforcing grade silica such as being mixed with the product of the first non-productive in a second non-productive mixing stage. The final curatives, including sulfur-vulcanizing agents, are typically mixed in the final stage which is conventionally called the "productive" mix stage in which the mixing typically occurs at a temperature, or ultimate temperature, lower than the mix temperature(s) than the preceding non-productive mix stage(s). The rubber, two silicas, silica coupler and carbon black, if used, are mixed in one or more non-productive mix stages. The terms "non-productive" and "productive" mix stages are well known to those having skill in the rubber mixing art. The rubber composition containing the rubber and two silicas should, as well as the sulfur-containing organosilicon compound, if used, be subjected to a thermomechanical-mixing step. The thermomechanical-mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization, the rubber composition can be used for various components in a tire. For example, the rubber composition may be in the form of a tire tread or sidewall component, such as a sidewall stripe or indicial marking. Such tire components and tires can be built, shaped, molded and cured by various methods which are known and will be readily apparent to those having skill in such art. Preferably, the rubber composition is used in the tread or sidewall of a tire. In the case of a sidewall component, the component may be extruded as part of the sidewall, or separately molded and applied to the sidewall before curing, as is known in the art. A sidewall stripe or indicial marking such as a logo, lettering or the like may have a thickness in a range of from about 0.1 to about 3 millimeters (mm). As can be appreciated, the tire may be a passenger tire, aircraft tire, truck tire and the like. Preferably, the tire is a passenger tire. The tire may also be a radial or bias, with a radial tire being preferred.

While certain representative embodiments and details have been shown for the purpose of illustrating the invention, it will be apparent to those skilled in this art that various changes and modifications may be made therein without departing from the spirit or scope of the invention.

What is claimed is:

1. A method of making a pneumatic tire, comprising the steps of:
   (A) mixing a rubber composition comprising at least one elastomer containing olefinic unsaturation, and a compound of formula I

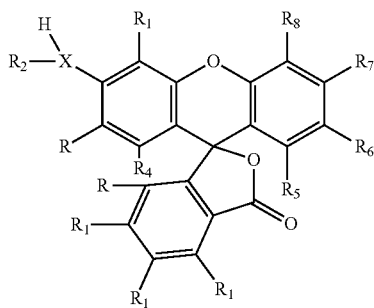

wherein:
$R_1$, $R_3$, $R_4$, $R_5$, $R_6$, and $R_8$ are each independently hydrogen, alkyl, aryl, halogen, or substituted or unsubstituted oxygen, nitrogen or sulfur atoms;
$R_2$ is hydrogen, alkyl, aryl, or is absent;
$R_7$ is substituted or unsubstituted oxygen, nitrogen, sulfur, or halogen;
$R_9$, $R_{10}$, $R_{11}$ and $R_{12}$ are each independently hydrogen, alkyl, aryl, halogen, nitro or substituted or unsubstituted oxygen, nitrogen or sulfur atoms;
and X is oxygen, sulfur, or nitrogen;
   (B) extruding the rubber composition to form a tire component; and
   (C) building a tire comprising the tire component.

2. The method of claim 1, wherein $R_2$ is absent, $R_4$, $R_5$, $R_9$, $R_{10}$, $R_{11}$ and $R_{12}$ are each hydrogen, X is oxygen, and the other substituents are selected from the group consisting of:
   $R_1$ and $R_8$ are each hydrogen, $R_3$ and $R_6$ are each n-hexyl and $R_7$ is benzyloxy;
   $R_1$ and $R_8$ are each hydrogen, $R_3$ and $R_6$ are each n-hexyl and $R_7$ is ethoxy;
   $R_1$ and $R_8$ are each hydrogen, $R_3$ and $R_6$ are each ethyl and $R_7$ is benzyloxy;
   $R_1$ and $R_8$ are each hydrogen, $R_3$ and $R_6$ are each n-hexyl and $R_7$ is ethoxy;
   $R_1$ and $R_8$ are each methyl, $R_3$ and $R_6$ are each hydrogen and $R_7$ is benzyloxy;
   $R_1$ and $R_8$ are each methyl, $R_3$ and $R_6$ are each hydrogen and $R_7$ is 2-methoxyethoxy;
   $R_1$ and $R_8$ are each hydrogen, $R_3$ and $R_6$ are each ethyl and $R_7$ is 3-methylbut-1-oxy;
   $R_1$ and $R_8$ are each hydrogen, $R_3$ and $R_6$ are each ethyl and $R_7$ is 2-methylbenzyloxy;
   $R_1$ and $R_8$ are each hydrogen, $R_3$ and $R_6$ are each ethyl and $R_7$ is 3-methylbenzyloxy;
   $R_1$ and $R_8$ are each hydrogen, $R_3$ and $R_6$ are each benzyl and $R_7$ is benzyloxy;
   $R_1$ and $R_8$ are each hydrogen, $R_3$ and $R_6$ are each propyl, and $R_7$ is benzyloxy; and
   $R_1$ and $R_8$ are each hydrogen, $R_3$ and $R_6$ are each benzyl and $R_7$ is 3-methylbut-1-oxy.

3. The method of claim 1, wherein $R_2$ is absent; $R_4$, $R_5$, $R_6$, $R_8$, $R_9$, $R_{10}$, $R_{11}$ and $R_{12}$ are each hydrogen; X is oxygen; and the other substituents are selected from the group consisting of:
   $R_1$ is hydrogen, $R_3$ is bromine and $R_7$ is phenylamino;
   $R_1$ is hydrogen, $R_3$ is bromine and $R_7$ is N-ethyl-N-phenylamino;
   $R_1$ is hydrogen, $R_3$ is bromine and $R_7$ is N-butyl-N-phenylamino;
   $R_1$ is hydrogen, $R_3$ is bromine and $R_7$ is N-hexyl-N-phenylamino;
   $R_1$ is hydrogen, $R_3$ is bromine and $R_7$ is N-benzyl-N-phenylamino;
   $R_1$ is hydrogen, $R_3$ is bromine and $R_7$ is N,N-diphenylamino;
   $R_1$ is methyl, $R_3$ is bromine and $R_7$ is N-hexyl-N-phenylamino;
   $R_1$ is methyl, $R_3$ is bromine and $R_7$ is N-indolinyl; and
   $R_1$ is methyl, $R_3$ is bromine and $R_7$ is N-hexadecyl-N-phenylamino.

4. The method of claim 1, wherein $R_1$, $R_3$, $R_4$, $R_5$, $R_6$, and $R_8$ are each hydrogen; X is nitrogen; and the other substituents are selected from the group consisting of:
   $R_2$ is phenyl, $R_7$ is phenylamino, and $R_9$, $R_{10}$, $R_{11}$ and $R_{12}$ are each hydrogen;
   $R_2$ is 2-methylphenyl, $R_7$ is 2-methylphenylamino, and $R_9$, $R_{10}$, $R_{11}$ and $R_{12}$ are each hydrogen;
   $R_2$ is 2-ethylphenyl, $R_7$ is 2-ethylphenylamino, and $R_9$, $R_{10}$, $R_{11}$ and $R_{12}$ are each hydrogen;
   $R_2$ is 2,4,6-trimethylphenyl, $R_7$ is 2,4,6-trimethylphenylamino, and $R_9$, $R_{10}$, $R_{11}$ and $R_{12}$ are each hydrogen;
   $R_2$ is 2-chlorophenyl, $R_7$ is 2-chlorophenylamino, and $R_9$, $R_{10}$, $R_{11}$ and $R_{12}$ are each hydrogen; and
   $R_2$ is 2-methyl-4-octadecyloxyphenyl, $R_7$ is N-indolinyl, and $R_9$, $R_{10}$, $R_{11}$ and $R_{12}$ are each fluorine.

5. The method of claim 1 wherein the elastomer is selected from the group consisting of natural rubber (NR), epoxidized natural rubber (ENR), synthetic polyisoprene (IR), polychloroprene rubber (CR), polybutadiene (BR), styrene-butadiene rubber (SBR), isoprene-butadiene rubber (IBR), styrene-isoprene-butadiene rubber (SIBR), ethylene-propylene-diene rubber (EPDM), isobutylene-isoprene rubber (IIR, butyl rubber), isobutylene-isoprene rubber-chlorinated (CIIR, chlorobutyl rubber), isobutylene-isoprene rubber-brominated (BIIR, bromobutyl rubber), acrylonitrile-isoprene rubber (NIIR), acrylonitrile-butadiene rubber (NBR), urethane rubber (EU), and methysilicone rubbers (MQ, VMQ, PVMQ, FMQ).

6. The method of claim 1, wherein the component is selected from the group consisting of a tire tread and sidewall component.

7. The method of claim 1, wherein the component is selected from the group consisting of a sidewall stripe or indicial marking.

8. The method of claim 7, wherein the component has a thickness ranging from 0.1 to 3 mm.

* * * * *